S. R. Wilmot,
Sheet-Metal Die.
N° 56,313. Patented July 10, 1866.

Witnesses:
J. W. Coombs
A. Leclerc

Inventor:
S. R. Wilmot
pr Brown Coombs & C
Attys

UNITED STATES PATENT OFFICE.

SAMUEL R. WILMOT, OF BRIDGEPORT, CONNECTICUT.

IMPROVEMENT IN DIES FOR FORMING BEADS ON THE EDGES OF SHEET-METAL VESSELS.

Specification forming part of Letters Patent No. 56,313, dated July 10, 1866.

*To all whom it may concern:*

Be it known that I, SAMUEL R. WILMOT, of Bridgeport, in the county of Fairfield and State of Connecticut, have invented certain new and useful Improvements in Dies for Turning the Edges of Sheet-Metal Articles; and I do hereby declare that the following is a full, clear, and exact description of the same, reference being had to the accompanying drawings, making a part of this specification, in which—

Figure 1:
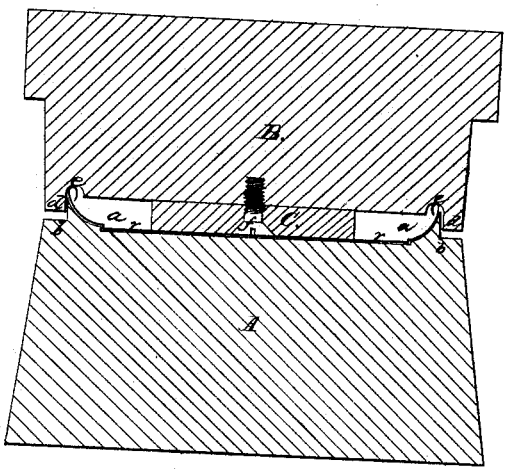
Figure 3:
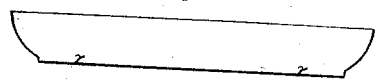
Figure 2:
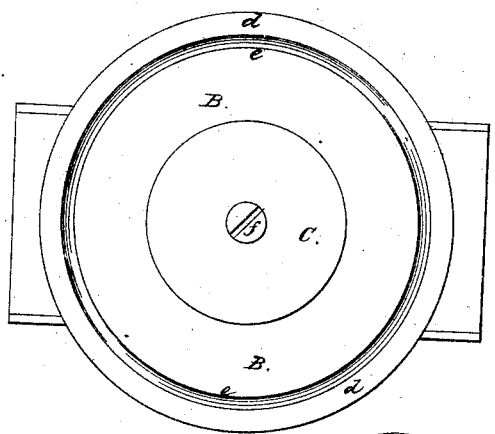

Figure 1 is vertical transverse section. Fig. 2 is an inverted plan view of the upper or moving die. Fig. 3 is a transverse section of a sheet-metal blank or disk previous to turning in the edges thereof.

Similar letters of reference indicate corresponding parts in all the figures.

This invention is designed for strengthening the edges of lamp-bottoms and other articles of sheet metal by turning them over inward in such manner as to produce a circular, or nearly circular, transverse profile; and it consists in a novel construction of dies for this purpose, whereby the edges are turned completely in circular, or nearly circular, form at all points of the circumference simultaneously.

The invention further consists in a novel means of holding the metal blank of which the article is to be formed, whereby the center thereof is prevented from being bulged upward by the pressure applied upon the edges to turn them.

To enable others to understand the construction and operation of my invention, I will proceed to describe it with reference to the drawings.

A is a fixed or stationary die, in the upper surface of which is a recess or depression, *a*, corresponding in shape and size to the outer surface of the lower portion of the blank *r*, the edge of which is to be turned over, and which receives said blank *r* during the operation of turning the said edge. Formed around the upper edge of the die A is a rabbet, *b*, the inner side of such rabbet being vertical and so near the circumference of the recess *a* that the sides of the said recess at the top thereof are very thin, or approaching the form of a sharp edge, in order to insure the proper action of the upper or moving die, B, as will be hereinafter shown.

B is the moving die, which is placed over the stationary die A, and has around its lower end a rim or flange, *d*, which fits around the inner or vertical side of the rabbet *b*, and moves up and down thereon. Formed in the flat lower end of the said die B, immediately within the rim *d*, is an annular groove, *e*, which is between quadrantal and semicircular in its cross-section, and acts upon the edges of the blank *r* to turn them over and inward, as will be presently described. Secured upon the central portion of the flat lower end of the die B is an elastic presser, C, which may be composed of a solid disk of india-rubber or other elastic gum fastened to the said die by a screw, *f*.

The blank *r*, having had its edges raised in the manner shown in Fig. 3 by any suitable means, is placed in the recess *a* with its edge projecting above the sides thereof. A downward movement is communicated to the die B by the agency of a screw or by any other suitable means, whereupon the elastic presser C first comes in contact with the bottom of the blank, and holds the said bottom firmly down upon the bottom of the said recess *a*, thus preventing it from being bulged upward by the pressure applied to the edge of the blank. Meanwhile the continued descent of the die B causes the outer sides of the annular groove *e* to strike upon the outer side of the upwardly-projecting edge of the blank and crowd it inward until it reaches the top of the said groove, when the continued downward pressure of the die B by the top and outer sides of the annular groove or curve *e* on the blank causes its edge to turn downward and back toward the inner sides of the blank, thus completely turning or folding it over in circular, or nearly circular, form at all points of the circumference of the blank simultaneously. It is not necessary that the annular channel *e* should be quadrantal on its inner side, so as to present a semicircular profile in its cross-section, as shown in the drawings, but it is sufficient that the curve be continued a mere fraction beyond a right angle to the vertical plane of its side or line of motion of the die, or the under side of the die B, within the annular groove, may be made convex, rising from the center or greatest depth of the said groove, the elastic presser C firmly holding down the bottom of the blank and preventing it from bulging upward during the operation of turning over the edge, as hereinbefore fully explained.

The presser C, instead of being formed of a block of india-rubber or other elastic gum, as hereinbefore set forth, may consist of a plunger working in a suitable hole or slot in the die B, and weighted or pressed downward by a spring of any proper kind.

What I claim as new, and desire to secure by Letters Patent, is—

1. The dies A B, constructed, arranged, and operating substantially as specified.

2. The groove $e$ in the die B, formed as described, and acting in connection with the recess $a$ of the die A for turning the edge of the blank, substantially as set forth.

3. The combination of the elastic presser C with the dies B and A, substantially as herein set forth, for the purpose specified.

S. R. WILMOT.

Witnesses:
D. W. KISSAM,
H. DWIGHT STANLEY.